(12) United States Patent
Mishima et al.

(10) Patent No.: US 11,577,188 B2
(45) Date of Patent: Feb. 14, 2023

(54) GAS-LIQUID SEPARATOR

(71) Applicant: AISIN CORPORATION, Aichi (JP)

(72) Inventors: Takashi Mishima, Kariya (JP); Ryuta Hayami, Minato-ku (JP)

(73) Assignee: AISIN CORPORATION, Kariya (JP)

( * ) Notice: Subject to any disclaimer, the term of this patent is extended or adjusted under 35 U.S.C. 154(b) by 375 days.

(21) Appl. No.: 16/847,911

(22) Filed: Apr. 14, 2020

(65) Prior Publication Data

US 2020/0324232 A1 Oct. 15, 2020

(30) Foreign Application Priority Data

Apr. 15, 2019 (JP) .............................. JP2019-077090

(51) Int. Cl.
| | | |
|---|---|---|
| *B01D 45/10* | (2006.01) | |
| *B01D 36/00* | (2006.01) | |
| *B01D 35/027* | (2006.01) | |
| *H01M 8/04119* | (2016.01) | |

(52) U.S. Cl.
CPC ............ *B01D 36/006* (2013.01); *B01D 45/10* (2013.01); *B01D 35/0273* (2013.01); *H01M 8/04164* (2013.01)

(58) Field of Classification Search
CPC .. B01D 36/006; B01D 45/10; B01D 35/0273; B01D 45/08; B01D 35/02; H01M 8/04164; H01M 8/04619; H01M 8/04776; Y02E 60/50

See application file for complete search history.

(56) References Cited

U.S. PATENT DOCUMENTS

| | | | |
|---|---|---|---|
| 9,997,793 | B2 | 6/2018 | Yamaura |
| 2009/0162730 | A1* | 6/2009 | Ohira ................ H01M 8/04253 429/410 |

(Continued)

FOREIGN PATENT DOCUMENTS

| | | |
|---|---|---|
| JP | 2002-373699 A | 12/2002 |
| JP | 2006-142250 A | 6/2006 |
| JP | 2006142250 A * | 6/2006 |

(Continued)

OTHER PUBLICATIONS

U.S. Appl. No. 16/238,564, filed Jan. 3, 2019, 2019/0282942 A1, Mishima, T, et al.

(Continued)

*Primary Examiner* — Waqaas Ali
(74) *Attorney, Agent, or Firm* — Oblon, McClelland, Maier & Neustadt, L.L.P.

(57) ABSTRACT

A gas-liquid separator includes a housing being supplied with water-containing gas, a gas-liquid separation portion being provided inside the housing and separating water from water-containing gas, a water storage portion being arranged on a bottom portion of the housing and storing water separated by the gas-liquid separation portion, and a valve mechanism enabling discharge of and stop of the discharge of water in the water storage portion via a discharge flow path communicating with the water storage portion. An inner wall of the housing has a guide surface flowing water toward the water storage portion and is provided with a regulating portion regulating staying of water in a vicinity of a flow-in port of the discharge flow path.

13 Claims, 7 Drawing Sheets

(56) References Cited

U.S. PATENT DOCUMENTS

2014/0272631 A1    9/2014   Sanderson et al.
2016/0141693 A1    5/2016   Hotta et al.

FOREIGN PATENT DOCUMENTS

| JP | 2016-072183 A | | 5/2016 |
|----|---------------|---|--------|
| JP | 2016-091733 A | | 5/2016 |
| JP | 2017-147159 A | | 8/2017 |
| JP | 2017147159 A | * | 8/2017 |

OTHER PUBLICATIONS

Extended European Search Report dated Jul. 23, 2020 in European Patent Application No. 20169675.4, 6 pages.

* cited by examiner

GAS-LIQUID SEPARATOR

CROSS REFERENCE TO RELATED APPLICATIONS

This application is based on and claims priority under 35 U.S.C. § 119 to Japanese Patent Application 2019-077090, filed on Apr. 15, 2019, the entire content of which is incorporated herein by reference.

TECHNICAL FIELD

This disclosure generally relates to a gas-liquid separator that is used for, for example, separating water from gas discharged from an anode of a fuel cell.

BACKGROUND DISCUSSION

In JP2017-147159A (Reference 1), as a gas-liquid separator having the above-described configuration, a technology in which a gas-liquid separator main body having a water storage portion in a lower portion is arranged and the gas-liquid separator main body, which is located at a location higher than the water storage portion, is provided with an introduction port and a discharge port is described.

In Reference 1, the gas-liquid separator main body is provided with, on an inside thereof, a vertical wall-shaped collision wall at an intermediate location between the introduction port and the discharge port and a rebound-reducing plate on an upper side of the water storage portion. According to this configuration, collision of gas introduced from the introduction port with the collision wall causes water contained in the gas to be separated, the separated water is stored in the storage portion, and the gas from which the water is separated is discharged from the discharge port.

In a fuel cell, electricity generation is achieved by supplying hydrogen gas to the anode side and air containing oxygen to the cathode side. In addition, unreacted hydrogen and water are contained in anode off-gas discharged from the anode side of the fuel cell, and the fuel cell is provided with a gas-liquid separator that removes the water contained in the anode off-gas, in a flow path returning the anode off-gas to the anode side in order to reuse the unreacted hydrogen.

The gas-liquid separator described in Reference 1 includes a storage portion storing water in a lower portion, a water level sensor detecting a water level of water stored in the storage portion, and a discharge valve enabling discharge of water stored in the storage portion. Note that, in Reference 1, control is performed so as to open the discharge valve while the sensor detects water.

When, for example, a gas-liquid separator that does not include a water level sensor, estimates an amount of water stored in a water storage portion (the storage portion in Reference 1) from an amount of power generated by a fuel cell through calculation or the like, and performs control of opening a discharge valve and discharging water in the water storage portion at a time point when the estimated amount of water reaches a predetermined amount of water is considered, it is effective that a discharge flow path formed between the water storage portion and the discharge valve is formed to have a small diameter like an orifice in order to suppress, for example, a difficulty that anode gas containing unreacted hydrogen is discharged after the discharge valve is opened and water is discharged.

When a fuel cell vehicle (FCV) is considered, water sometimes freezes inside a gas-liquid separator when, for example, electricity generation by a fuel cell is stopped in a cold area. In particular, when water freezes in a vicinity of a flow-in port of the discharge flow path having a small diameter as described above, the gas-liquid separator becomes unable to discharge water stored in the water storage portion on an occasion when electricity generation by the fuel cell is subsequently resumed.

Thus, when electricity generation is stopped because of, for example, stopping a fuel cell vehicle (FCV) in a cold area, it is conceivable that processing of discharging water in a storage portion before the stop of electricity generation or discharging processing of water by means of scavenging in which gas is supplied from outside is performed. However, even when the discharging processing of water as described above is performed, water droplets are sometimes left inside a gas-liquid separator main body after the stop while being attached to the inner surface thereof and, when, for example, a vibration is applied from outside, water droplets flow along the inner surface of the gas-liquid separator and reach a vicinity of the flow-in port of the discharge flow path, and there has thus been room for improvement.

A need thus exists for a gas-liquid separator which is not susceptible to the drawback mentioned above.

SUMMARY

A characteristic configuration of a gas-liquid separator according to this disclosure resides in that the gas-liquid separator includes a housing being supplied with water-containing gas, a gas-liquid separation portion being provided inside the housing and separating water from water-containing gas, a water storage portion being arranged on a bottom portion of the housing and storing water separated by the gas-liquid separation portion, and a valve mechanism enabling discharge of and stop of the discharge of water in the water storage portion via a discharge flow path communicating with the water storage portion. An inner wall of the housing has a guide surface flowing water toward the water storage portion and is provided with a regulating portion regulating staying of water in a vicinity of a flow-in port of the discharge flow path.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be explained with reference to the attached drawings.

[Main Body Configuration]

Figure 1:
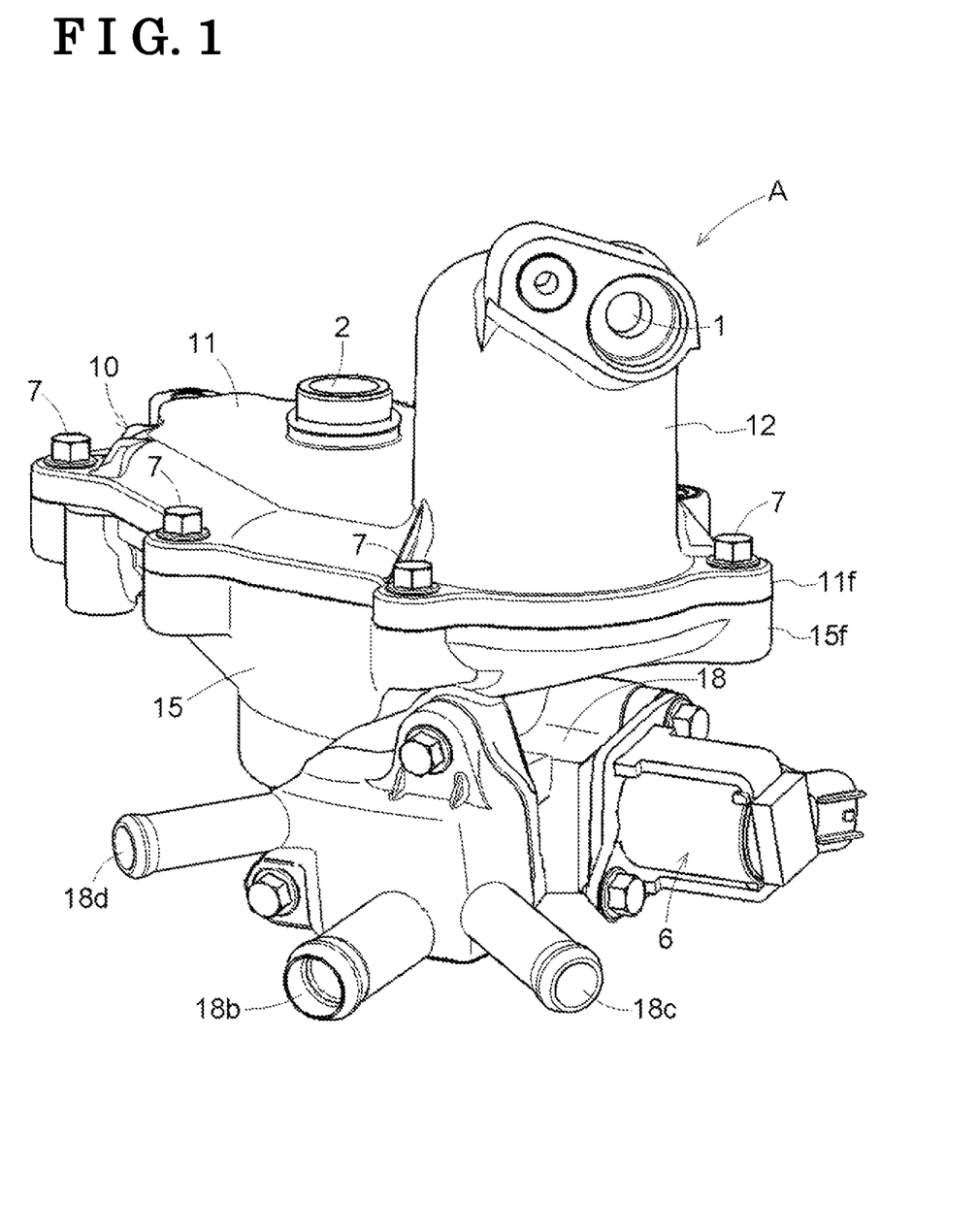
FIG. 1 is a perspective view of a gas-liquid separator.
Figure 2:
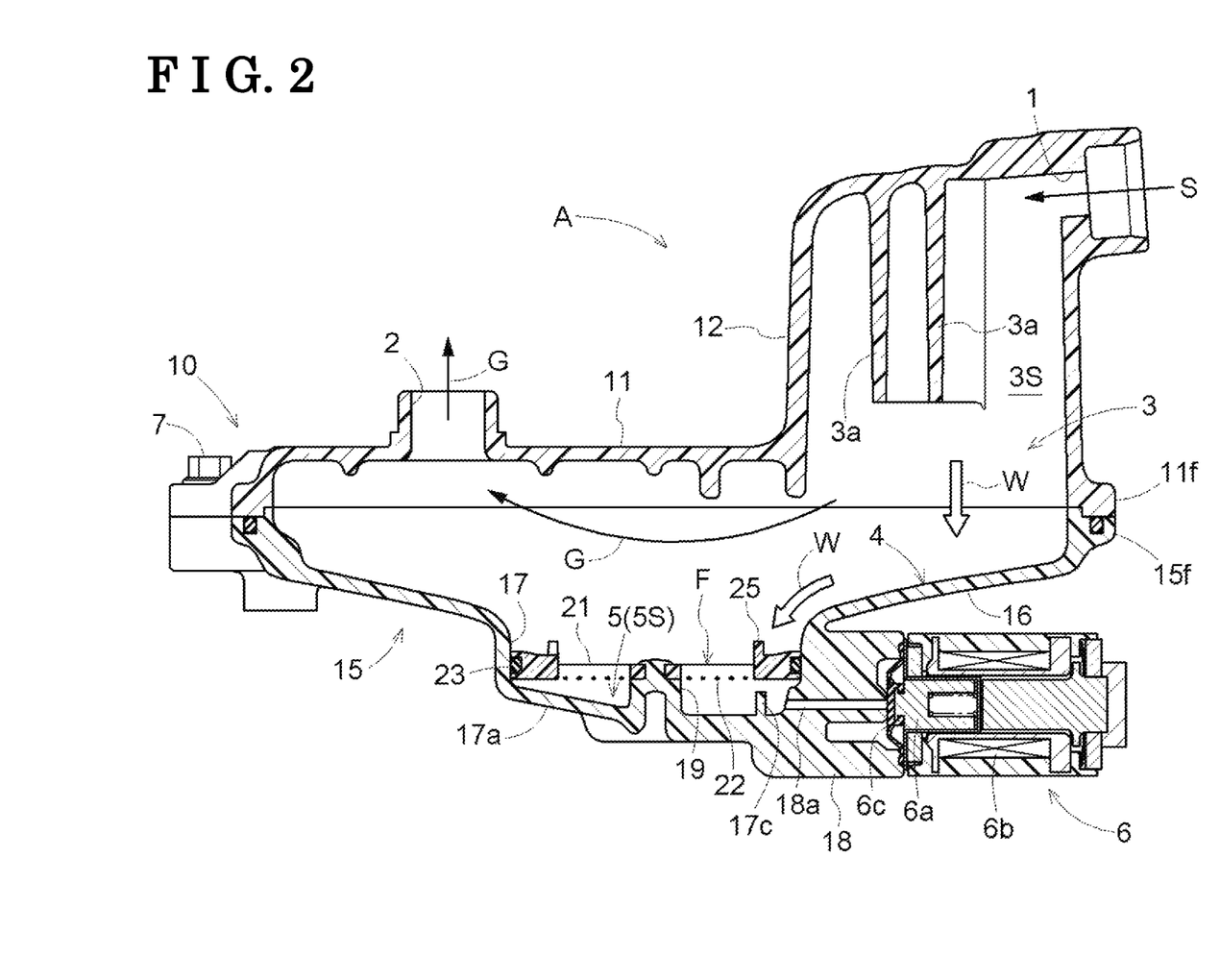
FIG. 2 is a vertical cross-sectional side view of the gas-liquid separator.

In FIGS. 1 and 2, a gas-liquid separator A that separates water contained in anode off-gas (an example of water-containing gas), which is discharged from the anode side of a fuel cell mounted on a fuel cell vehicle (FCV), is illustrated. The gas-liquid separator A is provided with an introduction port 1, a discharge port 2, a gas-liquid separation portion 3, a flow-down guide surface 4, and a water storage portion 5 in a housing 10. The gas-liquid separator A is also provided with an electromagnetic on-off valve 6 (an example of a valve mechanism) that controls discharge of water stored in the water storage portion 5 on the outside of the housing 10.

The gas-liquid separator A functions so as to separate and collect water contained in anode off-gas and is provided to a return flow path that returns the anode off-gas discharged from the discharge port 2 to an anode gas flow path of the fuel cell.

In the fuel cell, electricity is generated by humidifying and supplying fuel gas containing hydrogen gas to the anode side through the anode gas flow path and supplying oxidizing agent gas (air containing oxygen) to the cathode side through a cathode gas flow path. The reason for humidifying fuel gas supplied to the anode gas flow path is to wet the anode side of the fuel cell, and unreacted hydrogen gas and water are contained in anode off-gas discharged from the anode side.

As illustrated in FIGS. 1 and 2, in the gas-liquid separator A, anode off-gas is supplied from the introduction port 1 into the inside of the housing 10, water is separated from the anode off-gas in the gas-liquid separation portion 3 inside the housing 10, and the anode off-gas from which water is separated is discharged from the discharge port 2. In addition, the water separated in the gas-liquid separation portion 3 is guided by the flow-down guide surface 4 inside the housing 10 and thereby stored in the water storage portion 5.

Figure 5:
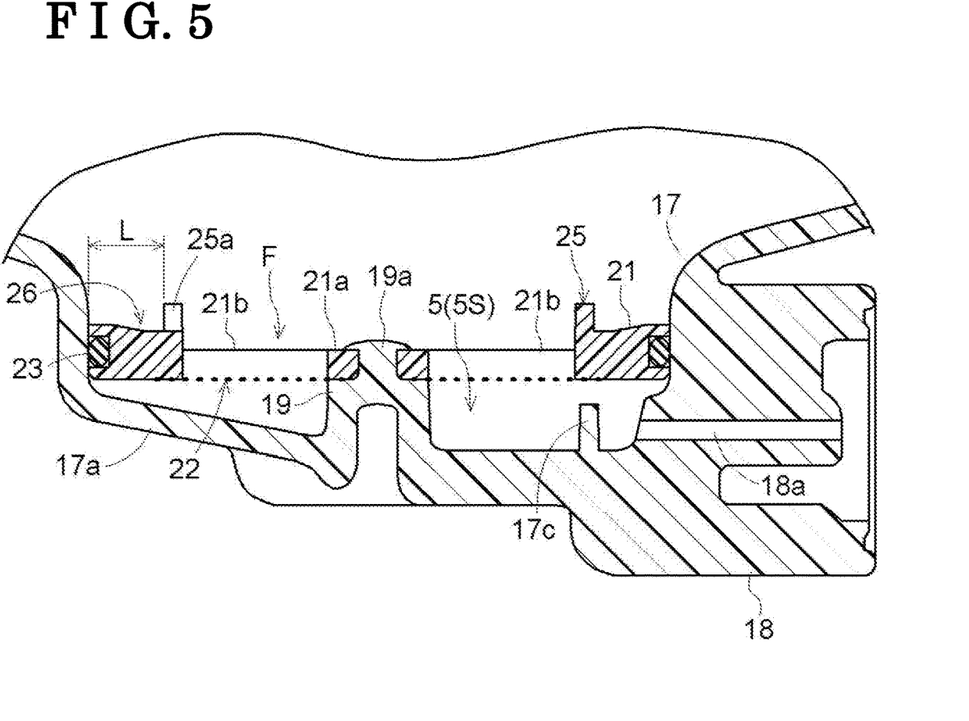
FIG. 5 is a vertical cross-sectional side view of a water storage portion and a filtering unit.

As illustrated in FIGS. 1 and 5, to the gas-liquid separator A, a discharge flow path 18a that communicates with a bottom portion of the water storage portion 5 and extends from the bottom portion toward the outside is formed, the electromagnetic on-off valve 6 that controls water flow in the discharge flow path 18a is provided, and a water discharge port 18b from which water is discharged to the outside when the electromagnetic on-off valve 6 is opened is provided. In addition, the discharge flow path 18a is formed to have a small diameter like an orifice so as to suppress discharge of anode off-gas containing unreacted hydrogen or control the discharge to a constant amount when the electromagnetic on-off valve 6 is in an open state at the time of discharging water in the water storage portion 5.

Since the amount of water stored in the water storage portion 5 can be estimated from the amount of power generated by the fuel cell, the amount of water in the water storage portion 5 is estimated by a control device, such as an ECU, based on the amount of power generated. Based on the estimation, control in which the control device opens the electromagnetic on-off valve 6 and thereby discharges water is performed. The gas-liquid separator A may be configured to be provided with a sensor for detecting the amount of water stored in the water storage portion 5 and open the electromagnetic on-off valve 6, based on a detection result of the sensor.

[Housing]

The gas-liquid separator A is provided to a vehicle in a position the up-and-down relationship of which is set as illustrated in FIGS. 1 and 2. The housing 10 includes an upper housing 11 and a lower housing 15, and fastening an upper flange 11f of the upper housing 11 and a lower flange 15f of the lower housing 15 to each other using a plurality of bolts 7 causes an internal space to be formed.

The upper housing 11 and the lower housing 15 are made of resin and have a sealing material sandwiched at a boundary surface between the upper flange 11f and the lower flange 15f. Note that the upper housing 11 and the lower housing 15 may also be formed of a metal, such as aluminum.

Figure 3:
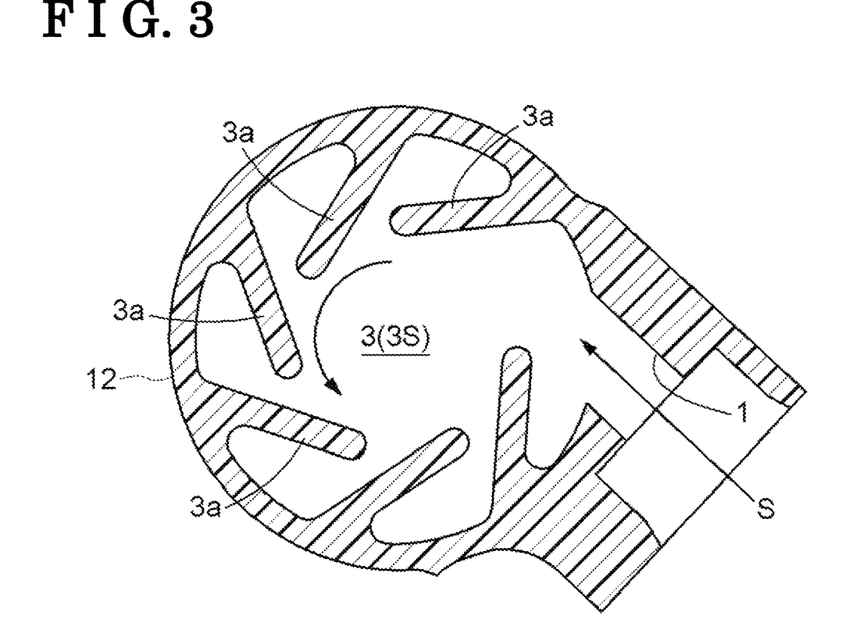
FIG. 3 is a lateral cross-sectional plan view of a part of a bulging wall including an introduction port.
Figure 4:
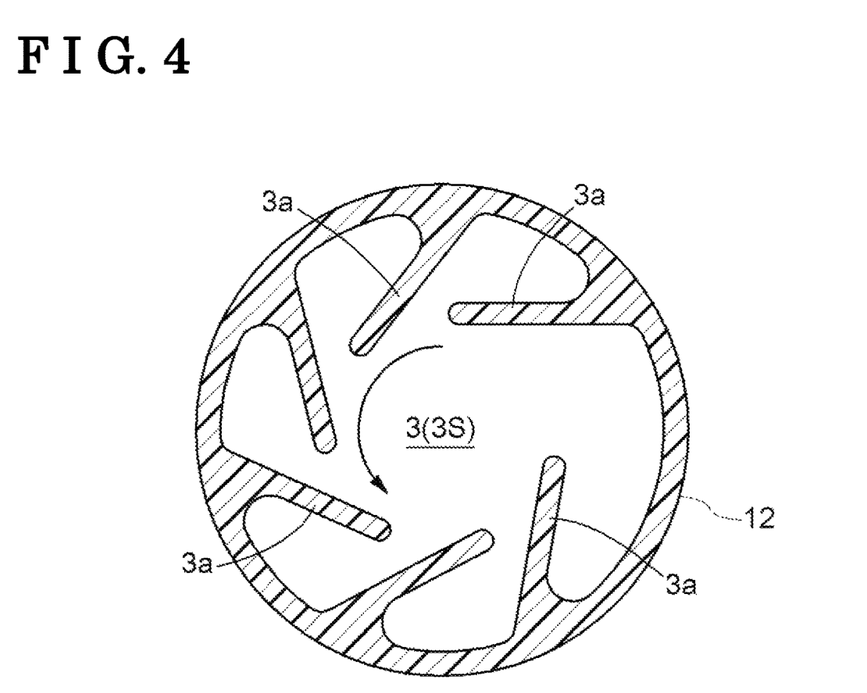
FIG. 4 is a lateral cross-sectional plan view of an intermediate part of the bulging wall.

In the upper housing 11, the introduction port 1 and the discharge port 2 are formed at locations that, when viewed in plan, sandwich the water storage portion 5. The discharge port 2 is formed in the upper housing 11 in a penetrating manner in the up-and-down direction. In addition, as illustrated in FIGS. 2 to 4, a bulging wall 12 that bulges out upward is integrally formed on the upper housing 11, and, on the inner side of the bulging wall 12, a separation space 3S is formed. On an upper edge portion of the bulging wall 12, the introduction port 1 is formed, and, in the separation space 3S on the inner side of the bulging wall 12, the gas-liquid separation portion 3 is arranged.

As illustrated in FIGS. 2 to 4, the bulging wall 12 has an inner wall that is, when viewed in plan, formed into a circle, and, in a region surrounded by the inner wall, the separation space 3S is formed as a cylindrical space. The gas-liquid separation portion 3 has a plurality of (in the drawings, six) collision walls 3a integrally formed therewith along the inner wall of the bulging wall 12 and is configured such as to, by colliding anode off-gas supplied from the introduction port 1 with the plurality of collision walls 3a, separate water contained in the anode off-gas with the water attached on the collision walls 3a as water droplets and further make the separated water fall downward from the collision walls 3a as water droplets.

The introduction port 1 is positioned at a height as high as the vicinity of the upper edges of the plurality of collision walls 3a. The introduction port 1 has an introduction position set so as to feed anode off-gas into the separation space 3S in a tangential direction along the inner periphery of the separation space 3S as illustrated in FIG. 3 and in a slightly obliquely downward direction as illustrated in FIG. 2. When anode off-gas is introduced in the direction illustrated as an introduction path S by an arrow in FIGS. 2 and 3, this configuration causes swirl flow that swirls (in FIGS. 3 and 4, swirls counterclockwise) in the separation space 3S inside an introducing cylindrical body 13 to be generated, and the swirl flow moves downward while swirling.

In the gas-liquid separation portion 3, a positional relationship between the introduction direction of the introduction path S at the introduction port 1 and the collision walls 3a is set in such a way that anode off-gas supplied from the introduction port 1 first collides with one of the plurality of collision walls 3a. Further, angles of the plurality of collision walls 3a are set so as to flow the anode off-gas having collided toward an adjacent collision wall 3a.

This configuration causes the anode off-gas supplied into the separation space 3S from the introduction port 1 to change flowing directions through successively colliding with the plurality of collision walls 3a and a swirl flow swirling in the separation space 3S to be thereby generated. Associated with the collision, water contained in the anode off-gas is formed into water droplets and attached on the collision walls 3a. In addition, disturbed flow of the anode off-gas and reduced flow velocity cause even fine water particles contained in the anode off-gas to be separated. As a result, water droplets fall downward as illustrated by an arrow as a water path W in FIG. 2 and flow on the flow-down guide surface 4 to the water storage portion 5, and gas from which water droplets have been separated flows through a lower portion of the separation space 3S toward the discharge port 2 as illustrated by an arrow as a gas flow G in FIG. 2 and is discharged upward from the discharge port 2.

In the lower housing 15, a flow-down wall portion 16 that is in an inclined position in which the closer to the water storage portion 5 a part thereof is located, the lower the part is located is formed, and the flow-down guide surface 4 is formed on the inner surface side of the flow-down wall portion 16. A cylindrically-shaped water storage wall portion 17 that extends downward is formed in order to form a water storage space at a boundary location between the flow-down wall portion 16 and the water storage portion 5, and a bottom wall 17a is integrally formed with the water storage wall portion 17 at the lower edge of the water storage wall portion 17. The water storage wall portion 17 is formed into a circle when viewed in plan, and the inner periphery of the water storage wall portion 17 serves as an opening of the water storage portion 5.

[Housing: Water Storage Portion]

As illustrated in FIGS. 2, 5, 7, and 8, the water storage portion 5 is formed by forming a water storage space 5S on the upper side of the bottom wall 17a in a region surrounded by the water storage wall portion 17. A flow path block 18 that projects in an outer lateral direction is formed on the outside of the water storage wall portion 17, and, as illustrated in FIGS. 2 and 5, the discharge flow path 18a is formed in the flow path block 18 and the electromagnetic on-off valve 6 is provided on the outer surface of the flow path block 18.

Further, as illustrated in FIG. 1, the water discharge port 18b is formed on the flow path block 18 in an outwardly projecting manner, and, on the flow path block 18, a supply portion 18c and a discharge portion 18d for coolant for performing heat exchange with the discharge flow path 18a and the like are formed in a projecting manner.

As illustrated in FIG. 2, the electromagnetic on-off valve 6 is provided with a valve body 6a that is held by spring biasing force at a location at which the valve body 6a closes the discharge flow path 18a and an electromagnetic solenoid 6b that, by energization, makes the valve body 6a perform an opening operation against the spring biasing force.

The electromagnetic on-off valve 6 is also provided with a sealing film 6c that is made of resin or rubber and flexibly deforms at a part of the valve body 6a that comes into contact with the flow-out port of the discharge flow path 18a (the right end of the discharge flow path 18a in FIG. 2) within the flow path block 18, and, when the valve body 6a is located at the closing location illustrated in FIG. 2, the sealing film 6c coming into contact with the flow-out port of the discharge flow path 18a causes the flow-out port to be maintained in the closed state. When the electromagnetic solenoid 6b is driven, the sealing film 6c is separated from the flow-out port of the discharge flow path 18a, associated with the operation of the valve body 6a, and water in the water storage portion 5 is thereby fed out from the discharge flow path 18a to the water discharge port 18b.

Figure 6:
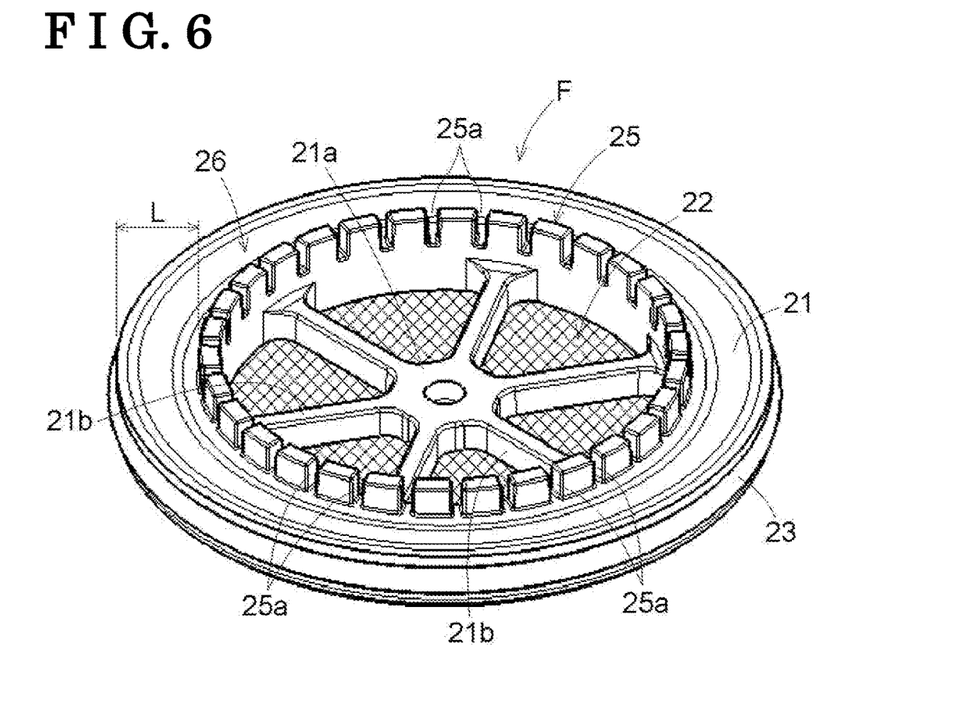
FIG. 6 is a perspective view of the filtering unit.
Figure 7:
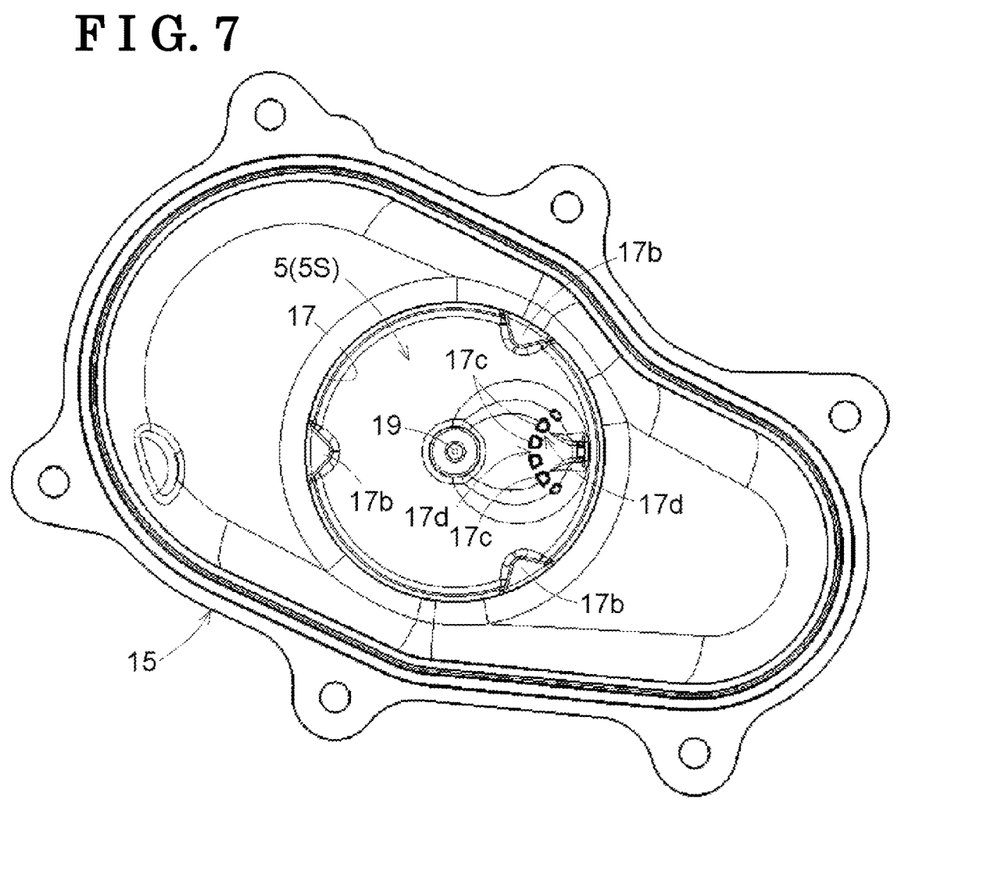
FIG. 7 is a lateral cross-sectional plan view of a housing.
Figure 8:
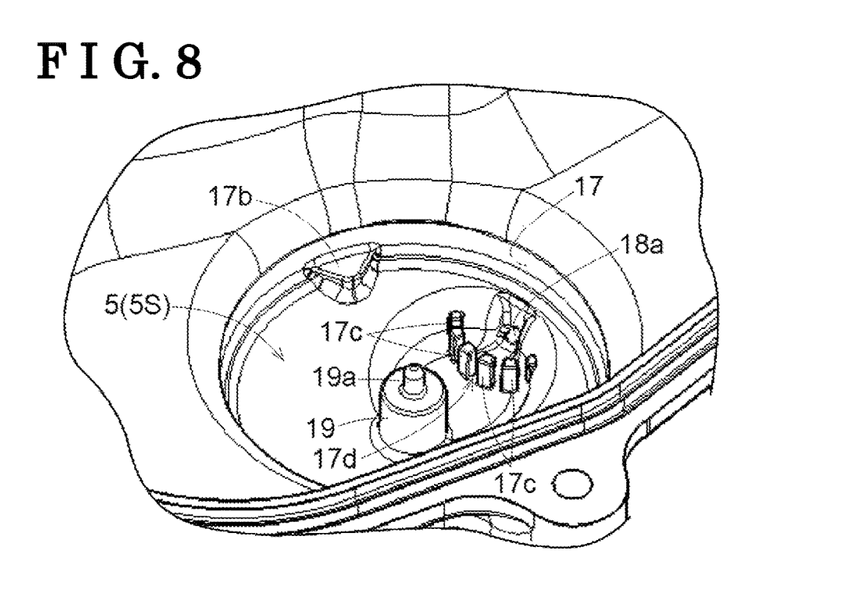
FIG. 8 is a perspective view of the water storage portion when viewed from an obliquely upper side.

As illustrated in FIGS. 7 and 8, a plurality of support projections 17b that project to the center side of the water storage portion 5 are formed on the inner surface of the water storage wall portion 17. In addition, a plurality of regulating bodies 17c (an example of a regulating portion) are formed at preset intervals on a part of the bottom wall 17a of the water storage wall portion 17 proximate to the flow-in port of the discharge flow path 18a (the left end of the discharge flow path 18a in FIG. 2). The support projections 17b function so as to support an annular frame 21 of a filtering unit F illustrated in FIGS. 5 and 6. The regulating bodies 17c are formed at locations located closer to the flow-in port of the discharge flow path 18a than the outer periphery of a filter 22 of the filtering unit F, which will be described later, when viewed in plan.

In addition, the plurality of regulating bodies 17c (an example of the regulating portion) have gaps between adjacent regulating bodies 17c functioning as regulating flow paths. Even when, after electricity generation by the fuel cell has been stopped and water has been discharged from the water storage portion 5, water droplets infiltrate into the holding projection 19 side of the regulating bodies 17c in the water storage portion 5 through the filtering unit F, forming the plurality of regulating bodies 17c as described above causes the water droplets not to pass through gaps 17d (an example of the regulating flow path) between the regulating bodies 17c due to surface tension, resulting in causing the water droplets to be regulated from moving to a vicinity of the flow-in port of the discharge flow path 18a.

As illustrated in FIGS. 2, 5, and 6, the filtering unit F, which removes foreign objects, such as dust, contained in water, is provided at a location at which the filtering unit F covers an upper portion of the water storage portion 5, and a regulating wall 25 (an example of the regulating portion) that regulates a flow of water droplets to the water storage portion 5 is integrally formed with the filtering unit F.

As illustrated in FIGS. 5 and 6, the filtering unit F is provided with the annular frame 21 that is made of resin and is fit into the water storage wall portion 17 and the filter 22 that is made of a net material formed using metal wire or nylon and is stretched tightly at the bottom surface of the annular frame 21. A ring-shaped seal 23 is fit into an annular groove on the outer periphery of the annular frame 21. The annular frame 21 may be made of metal.

The annular frame 21 is formed into a circle when viewed in plan, a fixing ring 21a having a through-hole disposed coaxially with the annular frame 21 is arranged in a central region of the circle, and a plurality of intermediate frames 21b are provided between the fixing ring 21a and the annular frame 21 in positions extending in a radial manner. The filter 22 is provided on the bottoms of the fixing ring 21a and the intermediate frames 21b.

As illustrated in FIGS. 2 and 5, the holding projection 19 is formed in an upwardly projecting manner from the center of the bottom wall of the water storage portion 5, and the filtering unit F is fixed with the upper end of a projection axis 19a at the center of the holding projection 19 inserted into the through-hole of the fixing ring 21a of the filtering unit F. When the filtering unit F is supported in this manner, the annular frame 21 is supported by the plurality of support projections 17b, which are formed on the inner surface of the water storage wall portion 17.

The filtering unit F is arranged with the seal 23 on the outer periphery of the annular frame 21 adhered closely to the inner periphery of the water storage wall portion 17. This configuration causes water flowing in from the flow-down wall portion 16 to come into contact with the regulating wall 25, pass through a plurality of recess-shaped portions 25a (an example of the regulating flow path) formed in the regulating wall 25, and be surely supplied to the filter 22. The surface of the annular frame 21 on the side on which the regulating wall 25 is formed is formed into a tapered surface having a position in which the surface comes closer to the water storage portion 5 as it approaches the regulating wall 25 from the outer periphery.

[Regulating Wall]

The regulating wall 25 (an example of the regulating portion) has an annular vertical wall-shaped portion having a position rising upward from the annular frame 21 at locations surrounding an opening edge along the inner periphery of the annular frame 21 (the outer peripheral surface of the filter 22) and also has a plurality of recess-shaped portions 25a of narrow widths having positions extending in radial directions on the upper surface of the vertical wall-shaped portion.

Since the regulating wall 25 is integrally formed with the annular frame 21 at the time of molding the annular frame 21, the regulating wall 25 is also formed of resin. In addition, each of the recess-shaped portions 25a is formed into a shape of a narrow width obtained by removing a part extending from the upper edge to the lower side of the vertical wall-shaped portion of the regulating wall 25. The width of each of the recess-shaped portions 25a is set at a value at which a water droplet of a predetermined amount cannot pass through the recess-shaped portion 25a due to surface tension, and each of the recess-shaped portions 25a is formed into a groove shape extending in a radial direction when viewed in plan. The water droplet of a predetermined amount means, for example, a water droplet of a small amount into which several water droplets assemble. Note that the regulating wall 25 may be joined to the annular frame 21 using a technology of heat welding or adhesion.

Figure 9:
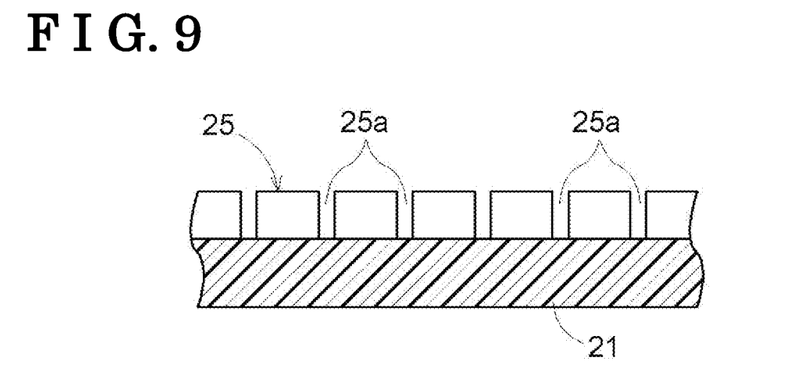
FIG. 9 is a diagram illustrating a structure of a regulating wall.

As illustrated in FIGS. 5, 6, and 9, arranging the outer periphery (the outer edge when viewed in plan) of the regulating wall 25 at a location separated inward from the outer edge of the annular frame 21 by a set distance L when viewed in plan causes an annular retaining space 26 corresponding to the set distance L to be formed.

When water droplets of predetermined amounts are to move in the direction toward the water storage space 5S while being attached to the flow-down guide surface 4 of the housing 10, the regulating wall 25 functions so as to regulate the water droplets of predetermined amounts from flowing into the water storage space 5S by retaining the water droplets so as to prevent the water droplets from passing through the recess-shaped portions 25a due to surface tension. When a greater amount of water droplets than the water droplets of predetermined amounts concentrate on the same part of the regulating wall 25, the regulating wall 25 functions so as to allow the water to flow through the recess-shaped portions 25a into the water storage space 5S due to pressure of the water.

Operational Effects of Embodiment

The gas-liquid separator A has, as described above, the discharge flow path 18a formed to have a small diameter like an orifice so as to, when opening the electromagnetic on-off valve 6 and thereby discharging water in the water storage portion 5, suppress discharge of anode off-gas containing hydrogen after the water has been discharged or control the discharge to a constant amount.

In such a configuration of a gas-liquid separator A, conventionally, there have been cases where, when, for example, electricity generation by a fuel cell is stopped in a cold area, even after water stored in the water storage portion 5 has been discharged, water droplets existing attached to the flow-down guide surface 4 of the housing 10 or water droplets in a system component located above the gas-liquid separator flow along the flow-down guide surface 4 into the water storage portion 5 due to, for example, an impact from outside and freeze at a vicinity of the flow-in port of the discharge flow path 18a or a place inside the discharge flow path 18a that the water droplets having infiltrated thereinto from the flow-in port thereof have reached. When water freezes at a vicinity of the flow-in port of or on the inside of the discharge flow path 18a as described above, conventional gas-liquid separators become unable to discharge water in the water storage portion 5 even when the electromagnetic on-off valve 6 is opened on the occasion when electricity generation by the fuel cell is subsequently resumed.

In order to cope with such a difficulty, in this embodiment, the regulating wall 25 is formed in a path along which water flows into the water storage portion 5 and the plurality of regulating bodies 17c are also formed inside the water storage portion 5. Even when, for example, a water droplet of a predetermined amount flows along the flow-down guide surface 4 and reaches the regulating wall 25, this configuration causes a part of the water droplet to be retained in a recess-shaped portion 25a of the regulating wall 25 while being adsorbed thereto and, at the same time, the rest of the water droplet to be stored in the retaining space 26 formed on the outer periphery side of the regulating wall 25.

Since the retaining space 26 is formed, even when a part of a water droplet exists on the outer side of the regulating wall 25, pressure exerted from the part of the water droplet is reduced and a phenomenon in which the water droplet flows to the inner side of the regulating wall 25 is thereby suppressed from occurring. As a result, water droplets up to a predetermined amount do not flow into the water storage space 5S, neither is a difficulty in which water droplets freeze inside the discharge flow path 18a brought about.

Further, even when water droplets fall from a part of the inner surface of the housing 10 right above the water storage portion 5 and the water droplets infiltrate into the water storage portion 5 by way of the filtering unit F and reaches the bottom wall 17a, suppression of a phenomenon in which the water droplets flow into the flow-in port of the discharge flow path 18a is achieved by preventing the water droplets from passing through the gaps 17d between the plurality of regulating bodies 17c. Because of this configuration, water droplets also do not flow into the water storage space 5S, neither is a difficulty in which water droplets freeze inside the discharge flow path 18a brought about. Note that the gas-liquid separator A may have only either the regulating wall 25 or the regulating bodies 17c.

Other Embodiments

This disclosure may be configured as described below in addition to the above-described embodiment (to constituent components having the same functions as those in the embodiment, the same reference numerals or signs as those in the embodiment are assigned).

Figure 10:
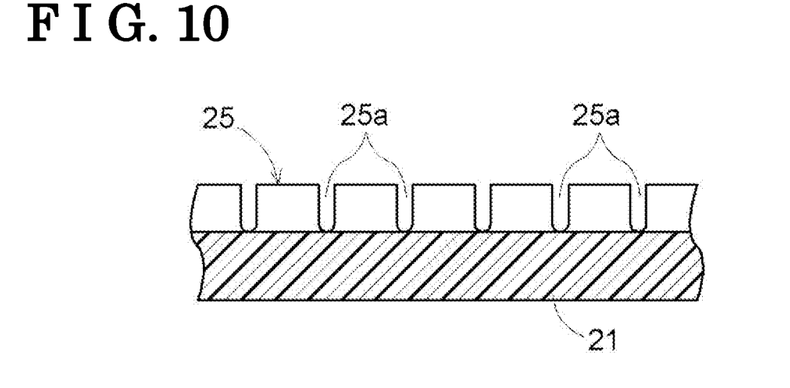
FIG. 10 is a diagram illustrating a structure of a regulating wall of another embodiment (a)

(a) As illustrated in FIG. 10, a regulating wall 25 (an example of the regulating portion), as with the configuration described in the embodiment, has a plurality of recess-shaped portions 25a (an example of the regulating flow path)

each of which is formed into a shape of a narrow width obtained by removing a part extending from the upper edge to the lower side of a vertical wall-shaped portion, which is formed into an annular shape when viewed in plan, in a position extending in a radial direction, and a bottom portion of each recess-shaped portion 25a is formed into a curved surface that curves semicircularly.

Forming the recess-shaped portions 25a the bottom portion of each of which is formed into a curved surface curving semicircularly in the regulating wall 25 as described above enables contact area with water droplets to be enlarged and flow of water droplets of predetermined amounts into a water storage space 5S to be suppressed more excellently.

Figure 11:
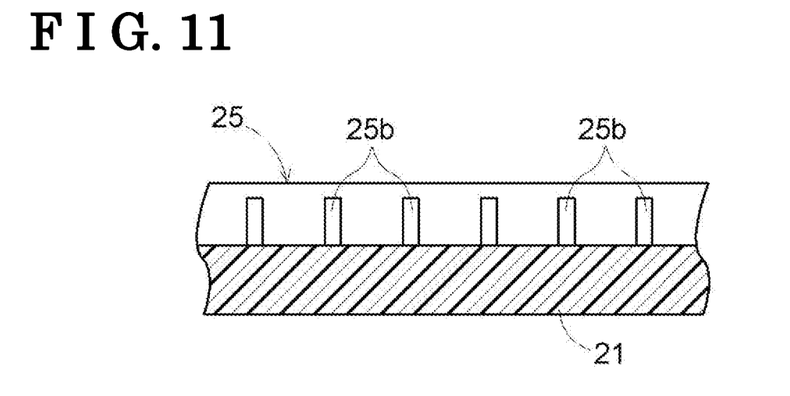
FIG. 11 is a diagram illustrating a structure of a regulating wall of still another embodiment (b)

(b) As illustrated in FIG. 11, a regulating wall 25 (an example of the regulating portion), as with the configuration described in the embodiment, has a vertical wall-shaped portion that is formed into an annular shape when viewed in plan and also has a plurality of slits 25b (an example of the regulating flow path) each of which is formed penetrating the vertical wall-shaped portion in a radial direction.

Forming the slits 25b in the regulating wall 25 as described above enables contact area with water droplets to be enlarged and a function of suppressing flow of water droplets of predetermined amounts to be improved.

(c) Configurations of a regulating flow path formed in a regulating wall 25 are not limited to the configuration of the recess-shaped portions 25a described in the embodiment and the configurations of regulating flow paths formed in the other embodiment (a) and the other embodiment (b), and it is possible to form through-holes that have various cross-sectional shapes, such as circles, ellipses, and polygons, in the regulating wall 25 as regulating flow paths.

Figure 12:
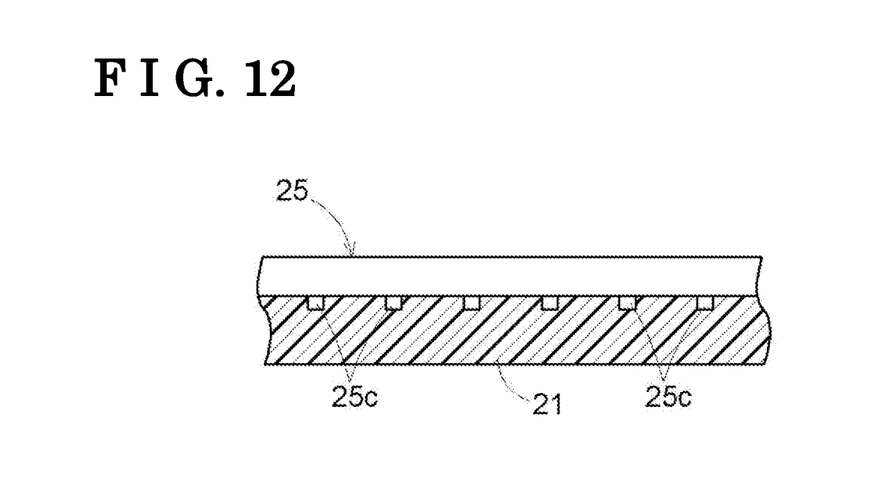
FIG. 12 is a diagram illustrating a structure of a regulating wall of still another embodiment (d)
Figure 13:
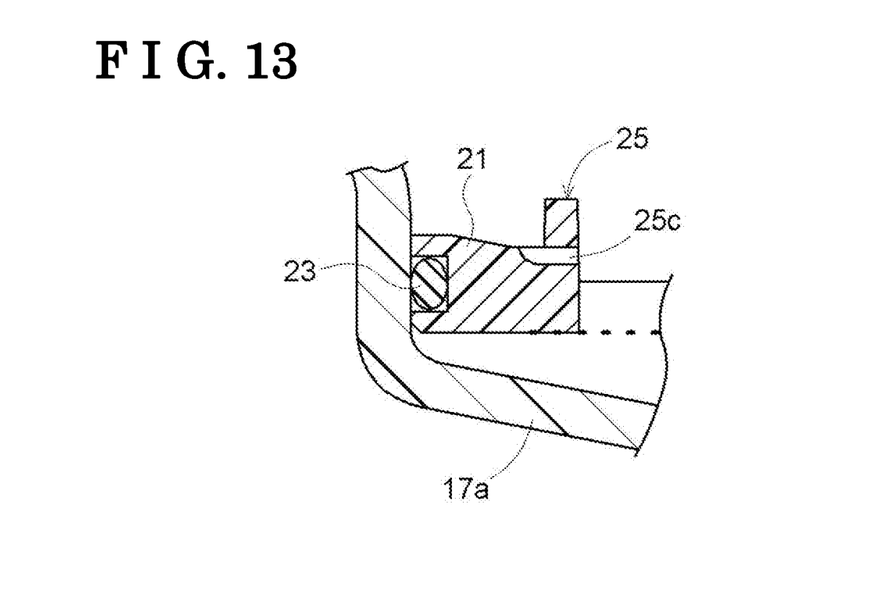
FIG. 13 is another diagram illustrating the structure of the regulating wall of the still another embodiment (d).

(d) As illustrated in FIGS. 12 and 13, a plurality of communication holes 25c (an example of the regulating flow path) each of which is formed into a hole shape and formed in an annular frame 21 so as to pass a boundary portion between a regulating wall 25 and the annular frame 21 are formed in positions extending in radial directions. Forming the plurality of communication holes 25c as described above also enables contact area with water droplets to be enlarged and flow of water droplets of predetermined amounts into a water storage space 5S to be suppressed excellently.

(e) In place of the configuration in which, as described in the embodiment, the regulating wall 25 is integrally formed with the filtering unit F, a configuration in which a regulating wall 25 is provided at locations surrounding a water storage wall portion 17 when viewed in plan is employed. This configuration causes flow of water droplets to be regulated at locations comparatively greatly separated from a water storage portion 5 and enables flow-in of water into the water storage portion 5 to be surely regulated.

This disclosure can be applied to anode off-gas of a fuel cell and a gas-liquid separator that separates water from anode off-gas.

A characteristic configuration of a gas-liquid separator according to this disclosure resides in that the gas-liquid separator includes a housing being supplied with water-containing gas, a gas-liquid separation portion being provided inside the housing and separating water from water-containing gas, a water storage portion being arranged on a bottom portion of the housing and storing water separated by the gas-liquid separation portion, and a valve mechanism enabling discharge of and stop of the discharge of water in the water storage portion via a discharge flow path communicating with the water storage portion. An inner wall of the housing has a guide surface flowing water toward the water storage portion and is provided with a regulating portion regulating staying of water in a vicinity of a flow-in port of the discharge flow path.

According to the characteristic configuration, since the regulating portion regulates, even when, after water in the water storage portion is discharged by opening the valve mechanism immediately after electricity generation by a fuel cell is stopped, water droplets attached to the inner surface of the housing flow along the guide surface due to an impact from outside or the like, staying of water in a vicinity of the flow-in port of the discharge flow path, water does not infiltrates into the vicinity of the flow-in port of the discharge flow path, neither does water freeze inside the discharge flow path.

Therefore, a gas-liquid separator capable of, even when water droplets exist being attached to the inner surface of the gas-liquid separator after electricity generation is stopped, suppressing a difficulty that the water droplets flow into the discharge flow path is configured. In particular, even when a cross-section of the discharge flow path, which communicates with the water storage portion, is formed to have a small diameter, it becomes possible to suppress water in the discharge flow path from freezing.

As another configuration, the regulating portion may be provided with a plurality of regulating flow paths inhibiting water droplets of a predetermined amount flowing in from the guide surface from flowing and allowing a greater amount of water than water droplets of a predetermined amount to flow.

According to the another configuration, when water droplets up to a predetermined amount are brought into contact with a specific regulating flow path among the plurality of regulating flow paths formed as regulating flow paths, it is possible to retain the water droplets up to a predetermined amount at the regulating portion without causing the water droplets to pass through the specific regulating flow path due to surface tension of water. When water flows to the regulating flow paths as a continuous stream of water, such as when electricity generation is performed by a fuel cell, it becomes possible to cause the water to pass through the regulating flow paths of the regulating portion due to viscosity of water and flow into the water storage portion.

As still another configuration, the regulating portion may have a vertical wall-shaped portion surrounding an outer periphery of an opening of the water storage portion, and the regulating flow paths may be formed by a plurality of recess-shaped portions formed on an upper edge portion of the vertical wall-shaped portion.

According to the still another configuration, it is possible to easily form the regulating portion and the regulating flow paths.

As still another configuration, the housing may include an upper housing being provided with the gas-liquid separation portion and a lower housing being provided with the water storage portion, and the regulating portion may be provided to the lower housing.

According to the still another configuration, providing the regulating portion to the lower housing enables the regulating portion to be retained at an appropriate location even when the upper housing is separated.

As still another configuration, the gas-liquid separator may include a filter removing dust contained in water flowing into the water storage portion, and the regulating portion may be arranged in a region extending along an outer periphery of the filter.

According to the still another configuration, even when dust is contained in water separated from water-containing gas inside the gas-liquid separator, it becomes possible to remove the dust by using the filter. In addition, since the filter is arranged at a location at which whole water flowing into the water storage portion can be filtered, arranging the regulating portion at the outer periphery of the filter enables a flow of water droplets flowing along the guide surface of the inner wall of the housing to be regulated.

As still another configuration, the filter may have an annular frame to be fit into an upper portion of the water storage portion, and the regulating portion may be integrally formed with the frame.

According to the still another configuration, forming the regulating portion on the annular frame constituting the filter makes it unnecessary to arrange a dedicated member for supporting the regulating portion inside the housing and to directly form the regulating portion inside the housing, and enables the number of components to be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A gas-liquid separator comprising:
a housing being supplied with water-containing gas;
a gas-liquid separation portion being provided inside the housing and separating water from water-containing gas;
a water storage portion being arranged on a bottom portion of the housing and storing water separated by the gas-liquid separation portion;
a valve mechanism enabling discharge of and stop of the discharge of water in the water storage portion via a discharge flow path communicating with the water storage portion; and
a filter removing dust contained in water flowing into the water storage portion, wherein
an inner wall of the housing has a guide surface flowing water toward the water storage portion and is provided with a regulating portion regulating staying of water in a vicinity of a flow-in port of the discharge flow path,
the regulating portion includes an annular vertical-shaped portion and a plurality of recess-shaped portion, and
the regulating portion is arranged in a region extending along an outer periphery of the filter.

2. The gas-liquid separator according to claim 1, wherein the regulating portion is provided with a plurality of regulating flow paths inhibiting water droplets of a predetermined amount flowing in from the guide surface from flowing, and allowing a greater amount of water than the water droplets of a predetermined amount to flow.

3. The gas-liquid separator according to claim 2, wherein the regulating portion has a vertical wall-shaped portion surrounding an outer periphery of an opening of the water storage portion, and
the regulating flow paths are formed by a plurality of recess-shaped portions formed on an upper edge portion of the vertical wall-shaped portion.

4. The gas-liquid separator according to claim 1, wherein the housing includes an upper housing being provided with the gas-liquid separation portion and a lower housing being provided with the water storage portion, and
the regulating portion is provided to the lower housing.

5. The gas-liquid separator according to claim 2, wherein the housing includes an upper housing being provided with the gas-liquid separation portion and a lower housing being provided with the water storage portion, and
the regulating portion is provided to the lower housing.

6. The gas-liquid separator according to claim 3, wherein the housing includes an upper housing being provided with the gas-liquid separation portion and a lower housing being provided with the water storage portion, and
the regulating portion is provided to the lower housing.

7. The gas-liquid separator according to claim 1, wherein the filter has an annular frame to be fit into an upper portion of the water storage portion, and
the regulating portion is integrally formed with the frame.

8. The gas-liquid separator according to claim 2, wherein the filter has an annular frame to be fit into an upper portion of the water storage portion, and
the regulating portion is integrally formed with the frame.

9. The gas-liquid separator according to claim 3, wherein the filter has an annular frame to be fit into an upper portion of the water storage portion, and
the regulating portion is integrally formed with the frame.

10. The gas-liquid separator according to claim 4, wherein the filter has an annular frame to be fit into an upper portion of the water storage portion, and
the regulating portion is integrally formed with the frame.

11. The gas-liquid separator according to claim 5, wherein the filter has an annular frame to be fit into an upper portion of the water storage portion, and
the regulating portion is integrally formed with the frame.

12. The gas-liquid separator according to claim 6, wherein the filter has an annular frame to be fit into an upper portion of the water storage portion, and
the regulating portion is integrally formed with the frame.

13. A gas-liquid separator comprising:
a housing being supplied with water-containing gas;
a gas-liquid separation portion being provided inside the housing and separating water from water-containing gas;
a water storage portion being arranged on a bottom portion of the housing and storing water separated by the gas-liquid separation portion, the water storage portion being formed by a cylindrically-shaped water storage wall portion and a bottom wall integrally formed with the water storage wall portion at a lower edge of the water storage wall portion, an inner periphery of the water storage wall portion being an opening of the water storage portion; and
a valve mechanism enabling discharge of and stop of the discharge of water in the water storage portion via a discharge flow path communicating with the water storage portion, wherein
an inner wall of the housing has a guide surface flowing water toward the water storage portion and is provided with a regulating portion regulating staying of water in a vicinity of a flow-in port of the discharge flow path,
the regulating portion includes a vertical wall-shaped portion surrounding an outer periphery of the opening of the water storage portion and provided with a plurality of regulating flow paths inhibiting water droplets of a predetermined amount flowing in from the guide surface from flowing, and
a plurality of regulating bodies are provided at preset intervals on a part of the bottom wall proximate to a flow-in port of the discharge flow path.

\* \* \* \* \*